US010261586B2

(12) United States Patent
Levesque et al.

(10) Patent No.: US 10,261,586 B2
(45) Date of Patent: Apr. 16, 2019

(54) SYSTEMS AND METHODS FOR PROVIDING ELECTROSTATIC HAPTIC EFFECTS VIA A WEARABLE OR HANDHELD DEVICE

(71) Applicant: Immersion Corporation, San Jose, CA (US)

(72) Inventors: Vincent Levesque, Montreal (CA); Jamal Saboune, Montreal (CA); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 144 days.

(21) Appl. No.: 15/290,069

(22) Filed: Oct. 11, 2016

(65) Prior Publication Data

US 2018/0101232 A1  Apr. 12, 2018

(51) Int. Cl.
| | | |
|---|---|---|
| *G06F 3/01* | (2006.01) | |
| *G08B 6/00* | (2006.01) | |
| *G06F 1/16* | (2006.01) | |
| *G06F 3/041* | (2006.01) | |

(52) U.S. Cl.
CPC .............. *G06F 3/016* (2013.01); *G08B 6/00* (2013.01); *G06F 1/163* (2013.01); *G06F 3/041* (2013.01); *G06F 2203/04102* (2013.01); *G06F 2203/04809* (2013.01)

(58) Field of Classification Search
CPC .................................. G06F 3/016; G08B 6/00
See application file for complete search history.

(56) References Cited

U.S. PATENT DOCUMENTS

| 6,337,687 B1 | 1/2002 | Lee |
| 6,819,312 B2 | 11/2004 | Fish |
| 7,336,260 B2 | 2/2008 | Martin et al. |
| RE42,064 E | 1/2011 | Fish |
| 8,749,495 B2 | 6/2014 | Grant et al. |

(Continued)

FOREIGN PATENT DOCUMENTS

| EP | 2 432 202 A1 | 3/2012 |
| EP | 2 664 978 A2 | 11/2013 |

(Continued)

OTHER PUBLICATIONS

Colgate, J. Edward; retrieved on Jun. 22, 2017 from the internet: http://nxr.northwestern.edu/people/j-edward-colgate.

(Continued)

*Primary Examiner* — Brent Swarthout
(74) *Attorney, Agent, or Firm* — Kilpatrick Townsend & Stockton LLP

(57) ABSTRACT

One illustrative system disclosed herein includes a computing device with an electrostatic force ("ESF") haptic output device coupled to a surface of the computing device. The ESF haptic output device comprises a signal electrode that includes an insulation layer and a conductive layer positioned proximate to the insulation layer and the conductive layer is electrically coupled to a voltage supply to receive an amount of voltage for generating an ESF haptic effect, which can include a dynamic ESF haptic effect or a static ESF haptic effect. The ESF haptic output device can output the ESF haptic effect to the surface of the computing device to which the ESF haptic output device is coupled.

16 Claims, 8 Drawing Sheets

(56) References Cited

U.S. PATENT DOCUMENTS

| | | |
|---|---|---|
| 8,917,234 B2 | 12/2014 | Cruz-Hernandez et al. |
| 8,941,475 B2 | 1/2015 | Makinen et al. |
| 2002/0142701 A1 | 10/2002 | Rosenberg |
| 2006/0267944 A1 | 11/2006 | Rosenberg et al. |
| 2007/0178942 A1 | 8/2007 | Sadler et al. |
| 2008/0218488 A1 | 9/2008 | Yang et al. |
| 2009/0079550 A1 | 3/2009 | Makinen et al. |
| 2010/0171715 A1 | 1/2010 | Peterson et al. |
| 2010/0085169 A1 | 4/2010 | Poupyrev et al. |
| 2010/0141407 A1 | 6/2010 | Heubel et al. |
| 2010/0152794 A1 | 6/2010 | Radivojevic et al. |
| 2010/0231367 A1 | 9/2010 | Cruz-Hernandez et al. |
| 2010/0231508 A1 | 9/2010 | Cruz-Hernandez et al. |
| 2010/0231539 A1 | 9/2010 | Cruz-Hernandez et al. |
| 2010/0231540 A1 | 9/2010 | Cruz-Hernandez et al. |
| 2010/0231541 A1 | 9/2010 | Cruz-Hernandez et al. |
| 2010/0231550 A1 | 9/2010 | Cruz-Hernandez et al. |
| 2010/0283731 A1 | 11/2010 | Grant et al. |
| 2010/0289740 A1 | 11/2010 | Kim et al. |
| 2011/0051360 A1 | 3/2011 | Dabov et al. |
| 2011/0109588 A1 | 5/2011 | Makinen et al. |
| 2011/0193824 A1 | 8/2011 | Modarres et al. |
| 2011/0285667 A1 | 11/2011 | Poupyrev et al. |
| 2012/0142379 A1 | 6/2012 | Park |
| 2012/0229400 A1 | 9/2012 | Birnbaum et al. |
| 2012/0229401 A1* | 9/2012 | Birnbaum ............... G06F 3/016 345/173 |
| 2012/0268412 A1 | 10/2012 | Cruz-Hernandez et al. |
| 2012/0287068 A1 | 11/2012 | Colgate et al. |
| 2012/0327006 A1 | 12/2012 | Israr et al. |
| 2013/0002570 A1 | 1/2013 | Ogg |
| 2013/0164543 A1 | 6/2013 | Shibuya et al. |
| 2013/0222280 A1 | 8/2013 | Sheynblat et al. |
| 2013/0227410 A1 | 8/2013 | Sridhara et al. |
| 2013/0293494 A1 | 11/2013 | Reshef |
| 2013/0307789 A1 | 11/2013 | Karamath et al. |
| 2013/0314303 A1 | 11/2013 | Osterhout et al. |
| 2014/0118127 A1 | 5/2014 | Levesque et al. |
| 2014/0307897 A1 | 10/2014 | Takano |
| 2014/0320396 A1 | 10/2014 | Modarres et al. |
| 2014/0320431 A1 | 10/2014 | Cruz-Hernandez et al. |
| 2014/0347270 A1 | 11/2014 | Birnbaum et al. |
| 2015/0123775 A1 | 5/2015 | Kerdemelidis |
| 2015/0145657 A1* | 5/2015 | Levesque ............... G06F 3/016 340/407.2 |
| 2015/0185849 A1 | 7/2015 | Levesque et al. |
| 2015/0355710 A1 | 12/2015 | Modarres et al. |
| 2016/0004308 A1 | 1/2016 | Cruz-Hernandez et al. |
| 2016/0004309 A1 | 1/2016 | Modarres et al. |
| 2016/0018893 A1 | 1/2016 | Choi et al. |
| 2016/0282944 A1* | 9/2016 | Haga ............... G06F 3/016 |
| 2017/0178470 A1* | 6/2017 | Khoshkava ............. G06F 3/016 |

FOREIGN PATENT DOCUMENTS

| | | |
|---|---|---|
| EP | 2 796 964 A1 | 10/2014 |
| EP | 2 821 912 A1 | 1/2015 |
| EP | 2 963 522 A1 | 1/2016 |
| EP | 2 963 523 A1 | 1/2016 |
| KR | 10-1338 232 B1 | 12/2013 |
| WO | 2010/037894 A1 | 4/2010 |
| WO | 2013/007882 A1 | 1/2013 |

OTHER PUBLICATIONS

Tesla Touch: Electrovibration for Touch Surfaces; retrieved on Jun. 22, 2017 from the internet: http://www.olivierbau.com/teslatouch.php.

Tanvas (formerly Tangible Haptics); Rediscover Touch; retrieved on Jun. 22, 2017 from the internet: https://tanvas.co.

Northwestern students bringing "feel" to what you see on your phone; retrieved on Jun. 22, 2017 from the internet: http://www.chicagotribune.com/bluesky/originals/chi-mullenbach-shultz-northwestern-haptic-phones-bsi-20150108-story.html.

Yamamoto et al., A 2-DOF electrostatic sheet conveyer using wire mesh for desktop automation, Proceedings of the 2006 IEEE International Conference on Robotics and Automation, Orlando, FL, May 2006, p. 2208-2213.

European Patent Office Application No. 17196029.7, Extended European Search Report dated Feb. 6, 2018, 12 pages.

* cited by examiner

SYSTEMS AND METHODS FOR PROVIDING ELECTROSTATIC HAPTIC EFFECTS VIA A WEARABLE OR HANDHELD DEVICE

FIELD OF INVENTION

The present disclosure relates generally to user interface devices. More specifically, but not by way of limitation, this disclosure relates to providing electrostatic haptic effects via a wearable or handheld device.

BACKGROUND

Many modern computing devices can be worn (e.g., a smart watch, a wristband, bracelet, etc.) or held (e.g., a mobile phone, smartphone, gaming device, personal digital assistant ("PDA"), portable e-mail device, portable Internet access device, calculator, etc.) by a user. Such devices can be used to provide content to the user or the user may interact with such devices (e.g., by touching a surface of the devices).

SUMMARY

Various examples of the present disclosure provide systems and methods for providing electrostatic haptic effects via a wearable or handheld device.

In one embodiment, a device of the present disclosure may comprise a housing and a computing device disposed in the housing. The computing device can comprise a memory and a processor communicatively coupled to the memory. The device also comprises a first electrostatic force ("ESF") haptic output device disposed within a portion of the housing and in communication with the computing device and the first ESF haptic output device can be configured to output static ESF haptic effects. The device also comprises a second ESF haptic output device disposed within the housing and in communication with the computing device and the second ESF haptic output device can be configured to output dynamic ESF haptic effects. The first ESF haptic output device can comprise a first conductive layer electrically coupled to a voltage source and a first insulation layer disposed on the first conductive layer to prevent contact between a user and the first conductive layer. The second ESF haptic output device can comprise a second conductive layer electrically coupled to the voltage source and a second insulation layer disposed on the second conductive layer to prevent contact between the user and the second conductive layer.

In another embodiment, a method of the present disclosure may comprise: receiving a sensor signal indicating a contact between an object and a portion of a housing of a computing device; determining, in response to the sensor signal, an ESF haptic effect based at least in part on the contact, the ESF haptic effect including a static ESF haptic effect and a dynamic ESF haptic effect; and transmitting an ESF haptic signal associated with the ESF haptic effect to a first ESF haptic output device disposed within the portion of the housing or to a second ESF haptic output device disposed within the portion of the housing. The first ESF haptic output device can be configured to output static ESF haptic effects and the second ESF haptic output device can be configured to output dynamic ESF haptic effects. The first ESF haptic output device can comprise a first conductive layer electrically coupled to a voltage source and a first insulation layer disposed on the first conductive layer to prevent contact between a user and the first conductive layer. The second ESF haptic output device can comprise a second conductive layer electrically coupled to the voltage source and a second insulation layer disposed on the second conductive layer to prevent contact between the user and the second conductive layer.

In another embodiment, a non-transitory computer-readable storage medium of the present disclosure may comprise program code, which when executed by a processor can be configured to cause the processor to: receive a sensor signal indicating a contact between an object and a portion of a housing of a computing device; determine an ESF haptic effect based at least in part on the contact, the ESF haptic effect including a dynamic ESF haptic effect and a static ESF haptic effect; and transmit an ESF haptic signal associated with the ESF haptic effect to a first ESF haptic output device disposed within the portion of the housing or to a second ESF haptic output device disposed within the portion of the housing. The first ESF haptic output device can be configured to output static ESF haptic effects and the second ESF haptic output device can be configured to output dynamic ESF haptic effects. The first ESF haptic output device can comprise a first conductive layer electrically coupled to a voltage source and a first insulation layer disposed on the first conductive layer to prevent contact between a user and the first conductive layer. The second ESF haptic output device can comprise a second conductive layer electrically coupled to the voltage source and a second insulation layer disposed on the second conductive layer to prevent contact between the user and the second conductive layer.

These illustrative examples are mentioned not to limit or define the limits of the present subject matter, but to provide examples to aid understanding thereof. Illustrative examples are discussed in the Detailed Description, and further description is provided there. Advantages offered by various examples may be further understood by examining this specification and/or by practicing one or more examples of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
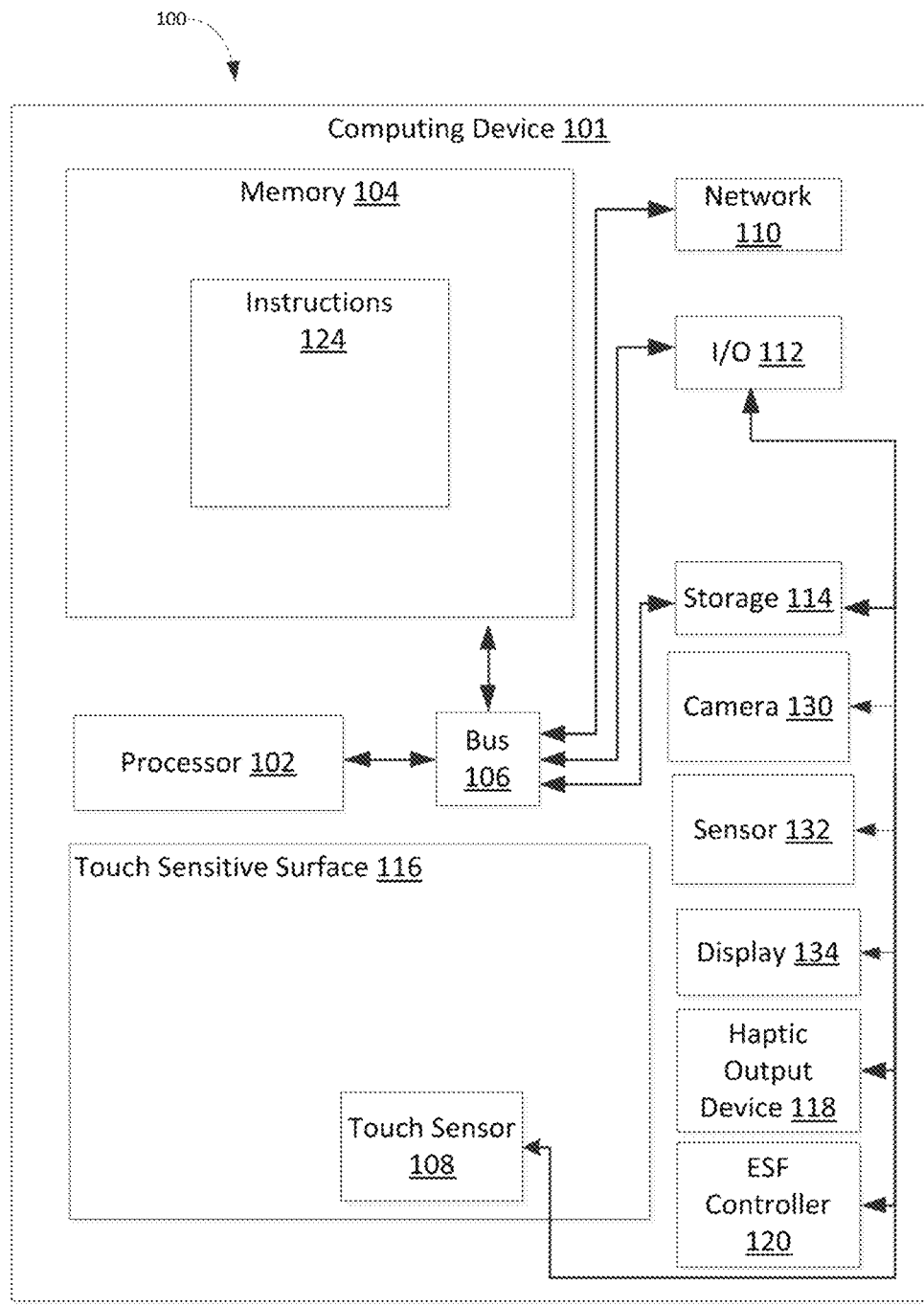
FIG. 1 is a block diagram showing a system for providing electrostatic haptic feedback via a wearable or handheld device according to one example.

Reference now will be made in detail to various and alternative illustrative examples and to the accompanying drawings. The same reference indicators will be used throughout the drawings and the following description to refer to the same or like items. Each example is provided by way of explanation, and not as a limitation. It will be apparent to those skilled in the art that modifications and variations can be made. For instance, features illustrated or described as part of one example may be used in another example to yield a still further example. Thus, it is intended that this disclosure include modifications and variations that come within the scope of the appended claims and their equivalents.

Illustrative Examples of Providing Electrostatic Haptic Feedback Via a Wearable Computing Device or a Handheld Computing Device One illustrative example of the present disclosure includes an electrostatic force ("ESF") haptic output device attached to a surface of a smartwatch. For example, the ESF haptic output device is attached to a band of the smartwatch.

In the illustrative example, the user wears the smartwatch around the user's wrist and the ESF haptic output device contacts the user's skin. The ESF haptic output device includes several components that allow the ESF haptic output device to output a haptic effect (e.g., textures, vibrations, change in perceived coefficient of friction, stroking sensations, and/or stinging sensations) that can be perceived by the user. For example, the ESF haptic output device includes a conductive layer and an insulation layer that is attached to the conductive layer. The conductive layer is electrically connected to a voltage supply that provides an amount of voltage to the conductive layer, which the user can perceive as a vibration when the user is wearing the smartwatch or if the user touches the band of the smartwatch. The insulation layer is positioned between the conductive layer and the user's skin and includes material that electrically insulates the user from the voltage to prevent the user from being shocked.

In this illustrative example, a ground electrode that includes a conductive layer can also be attached to the band of the smartwatch. The ground electrode can be positioned on the band to contact the user of the smartwatch (e.g., when the user is wearing the smartwatch). The ground electrode may amplify or increase a perceived strength of the haptic effect output by the ESF haptic output device.

In this illustrative example, the smartwatch is able to provide haptic effects to the user through the ESF haptic output device by sending signals of various magnitudes or durations to the ESF haptic output device. For example, the user receives an e-mail via the user's smartphone, which is connected to the smartwatch (e.g., via Bluetooth). The smartphone sends the e-mail to the smartwatch and the smartwatch outputs a haptic effect (e.g., a vibration) to the user via the ESF haptic output device to notify the user of the e-mail. The smartwatch also displays the e-mail on a display screen of the smartwatch. The smartwatch can initially output the haptic effect at one location on the band, but the smartwatch can subsequently output the haptic effect at various locations on the band, such as to imitate a countdown timer and indicate to the user that the e-mail will be displayed on the display screen for a period of time. For example, the haptic effects can indicate to the user that the e-mail will be displayed on the display screen for a short period of time (e.g., one second, five seconds, etc.), a longer period of time (e.g., fifteen seconds, thirty seconds, etc.), or any other length of time. In response to receiving the notification, the user can touch the display screen to view the e-mail or to receive information about the e-mail. For example, the user can slide a finger across the display screen and the smartwatch outputs a haptic effect (e.g., a rough texture) to indicate to the user that the e-mail is urgent. In this illustrative example, if the user does not touch the display screen within the period of time, the smartwatch can discontinue the haptic effect and stop displaying the e-mail. In the illustrative example, the ESF haptic output device can include one or more ESF haptic output devices, each of which can be attached to various parts of the smartwatch (e.g., a face or band of the smartwatch) and used to output various haptic effects.

These illustrative examples are given to introduce the reader to the general subject matter discussed here and are not intended to limit the scope of the disclosure. The following sections describe various additional features and examples with reference to the drawings in which like numerals indicate like elements, and directional descriptions are used to describe the illustrative examples but, like the illustrative examples, do not limit the present disclosure.

Illustrative Systems for Providing Electrostatic Haptic Feedback Via a Wearable Computing Device or a Handheld Computing Device FIG. 1 is a block diagram showing a system 100 for providing electrostatic haptic feedback via a wearable computing device or a handheld computing device according to one example. In the example depicted in FIG. 1, the system 100 includes a computing device 101 having a processor 102 in communication with other hardware via a bus 106. The computing device 101 may include, for example, a wearable device (e.g., a smartwatch, a ring, a wristband, bracelet, headband, hat, etc.), a handheld device (e.g., a tablet, video game controller), a mobile device (e.g., a smartphone), etc.

A memory 104, which can include any suitable tangible (and non-transitory) computer-readable medium such as RAM, ROM, EEPROM, or the like, embodies program components that configure operation of the computing device 101. In the example shown, computing device 101 further includes one or more network interface devices 110, input/output (I/O) interface components 112, and storage 114.

Network interface device 110 can represent one or more of any components that facilitate a network connection. Examples include, but are not limited to, wired network interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network). Further, while referred to as a "network" device, the network interface device 110 may allow for peer-to-peer connections with other devices, such as via Bluetooth, RFID, or NFC-style communications.

I/O components 112 may be used to facilitate wired or wireless connection to peripheral devices such as one or more displays 134, touch sensitive surfaces 116, game controllers, keyboards, mice, joysticks, cameras, buttons, speakers, microphones and/or other hardware used to input or output data. Storage 114 represents nonvolatile storage such as magnetic, optical, or other storage media included in computing device 101 or coupled to the processor 102.

In some examples, the computing device 101 includes one or more touch sensitive surfaces 116. Touch sensitive surface 116 represents any surface or portion of a surface that is configured to sense tactile input of a user. One or more touch sensors 108 are configured to detect a touch in a touch area (e.g., when an object contacts the touch sensitive surface 116) and transmit signals associated with the touch to the processor 102. In some examples, the touch sensor 108 may be configured to receive user input and transmit signals associated with the user input to the processor 102. Any suitable number, type, or arrangement of touch sensor 108 can be used. For example, resistive and/or capacitive sensors may be embedded in touch sensitive surface 116 and used to determine the location of a touch and other information, such as pressure, speed, and/or direction.

The touch sensor 108 can additionally or alternatively include other types of sensors. For example, optical sensors with a view of the touch sensitive surface 116 may be used to determine the touch position. As another example, the touch sensor 108 may include a LED (Light Emitting Diode) finger detector mounted on the side of a display. In some examples, touch sensor 108 may be configured to detect multiple aspects of the user interaction. For example, touch sensor 108 may detect the speed, pressure, and direction of a user interaction, and incorporate this information into the signal transmitted to the processor 102.

In some examples, the computing device 101 includes a touch-enabled display that combines a touch sensitive surface 116 and a display 134 of the computing device 101. The touch sensitive surface 116 may be overlaid on the display 134 or may be one or more layers of material above components of the display 134. In other examples, the computing device 101 may display a graphical user interface that includes one or more virtual user interface components (e.g., buttons) on the touch-enabled display and the touch sensitive surface 116 can allow interaction with the virtual user interface components.

In some examples, computing device 101 includes a camera 130. Although the camera 130 is depicted in FIG. 1 as being internal to the computing device 101, in some examples, the camera 130 may be external to and in communication with the computing device 101. As an example, the camera 130 may be external to and in communication with the computing device 101 via wired interfaces such as, for example, Ethernet, USB, IEEE 1394, and/or wireless interfaces such as IEEE1 802.11, Bluetooth, or radio interfaces.

The computing device 101 can include one or more sensors 132. The sensor 132 may include, for example, gyroscope, an accelerometer, a global positioning system (GPS) unit, a range sensor, a depth sensor, a camera, an infrared sensor, a microphone, a humidity sensor, a temperature sensor, an ambient light sensor, biosensor, a pressure sensor, a force sensor, a capacitive sensor, etc. In some examples, sensor 132 may include one or more touch sensors configured in substantially the same manner as touch sensor 108.

In some examples, the processor 102 may be in communication with a single sensor 132 and, in other examples, the processor 102 may be in communication with a plurality of sensors 132, for example, a gyroscope and an accelerometer. The sensor 132 is configured to transmit sensor signals to the processor 102. Further, in some examples, the sensor 132 may be in communication with the haptic output device 118.

Although the example shown in FIG. 1 depicts the sensor 132 internal to the computing device 101, in some examples, the sensor 132 is external to the computing device 101 and in wired or wireless communication with the computing device 101.

In the example depicted in FIG. 1, the system further includes an ESF controller 120, which is communicatively coupled to computing device 101 and configured to receive a haptic signal from the processor 102. In some examples, the ESF controller 120 may amplify or modify the haptic signal to generate an ESF haptic signal or the ESF controller may determine the ESF haptic signal based at least in part on the haptic signal. The ESF controller 120 is also configured to transmit the ESF haptic signal to a haptic output device 118. The ESF haptic signal may include a signal configured to cause the haptic output device 118 to output a haptic effect associated with the haptic signal. In some examples, the ESF signal may include an AC signal, AC voltage, a DC signal, or DC voltage from a power source.

In some examples, the ESF controller 120 may include one or more operational amplifiers, transistors, and/or other digital or analog components for amplifying signals. For example, in one example, the ESF controller 120 may include a high-voltage amplifier. Further, in some examples, the ESF controller 120 may include a processor, a microcontroller, a memory, a multiplexer, a crystal oscillator, a relay, a transistor, a field programmable gate array ("FPGA"), a flip-flop, and/or other digital or analog circuitry for generating an ESF haptic signal.

Although in the example shown in FIG. 1, the ESF controller 120 is depicted as being internal to the computing device 101, in some examples, the ESF controller may be external to and in communication with the computing device 101. The ESF controller 120 may be in communication with the computing device 101 via wired interfaces such as, for example, Ethernet, USB, IEEE 1394, and/or wireless interfaces such as IEEE1 802.11, Bluetooth, or radio interfaces.

In some examples, the system 100 further includes the haptic output device 118, which is communicatively coupled to the ESF controller 120. In some examples, the haptic output device 118 can be coupled to a surface associated with the computing device 101. For example, the haptic output device 118 can be coupled to the touch sensitive surface 116 of the computing device 101. The haptic output device 118 is configured to receive an ESF haptic signal (e.g., from the ESF controller 120) and output a haptic effect that can be sensed or perceived by a user (e.g., a user of the computing device 101). In some examples, the haptic output device 118 uses electrostatic attraction to output an ESF haptic effect to the user.

The ESF haptic effect can include a static ESF haptic effect. A static ESF haptic effect can include a haptic effect output by the haptic output device 118 that can be perceived by a user upon the user being in contact with the surface associated with the computing device 101 to which the haptic output device 118 is coupled. For example, the user may perceive the static ESF haptic effect when the user's skin is in constant contact with the haptic output device 118 or with the surface to which the haptic output device 118 is coupled. As an example, the user may perceive the static ESF haptic effect when the surface associated with the haptic output device 118 is in continuous contact with the user's skin. As another example, the user may perceive the static ESF haptic effect when the surface associated with the haptic output device 118 is in contact with the user's skin over a period of time such as, for example, five seconds, ten seconds, thirty seconds, or any length of time.

In some examples, the ESF haptic effect can include a dynamic ESF haptic effect. A dynamic ESF haptic effect includes a haptic effect that is perceived by a user upon the user sliding a body part (e.g., hand or finger) or an object (e.g., a stylus) along a surface associated with the haptic output device 118. For example, the user may perceive the dynamic ESF haptic effect as the user slides a finger across a surface of the touch sensitive surface 116. In some examples, the ESF haptic effect output by the haptic output device 118 may include a simulated texture, a simulated vibration, a stroking sensation, or a perceived change in a coefficient of friction on a surface associated with the computing device 101 (e.g., the touch sensitive surface 116).

The haptic output device 118 may include an electrostatic actuator or a signal electrode, which includes a conductive layer and an insulating layer. For example, FIG. 2 shows an example of a haptic output device for providing electrostatic haptic feedback via a wearable or handheld device according to one example.

Figure 2:
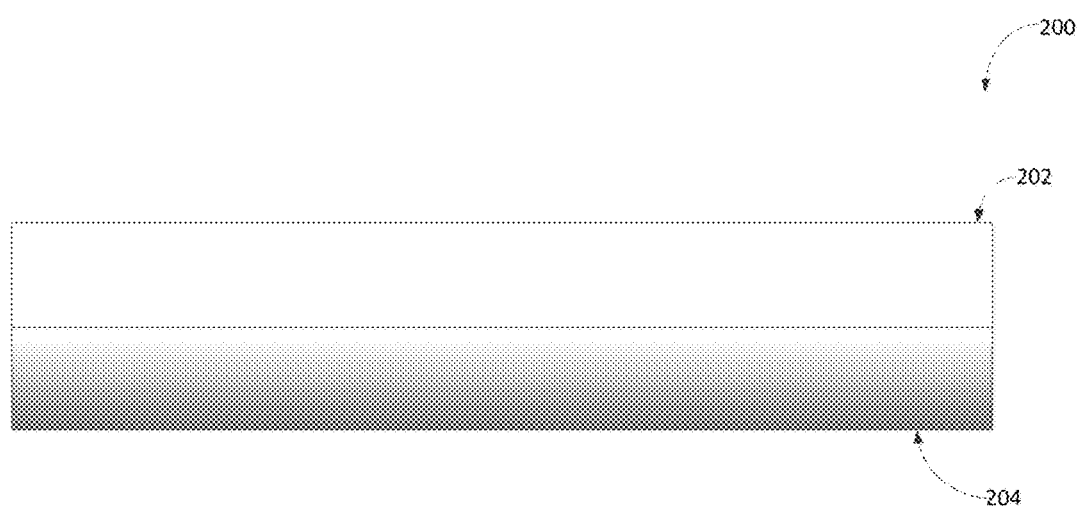
FIG. 2 shows an example of a haptic output device for providing electrostatic haptic feedback via a wearable or handheld device according to one example.

In the example depicted in FIG. 2, the haptic output device 118 includes a signal electrode 200 comprising an insulating layer 202 and a conductive layer 204 coupled to the insulating layer 202. In some examples, the insulating layer 202 may be glass, porcelain, plastic, polymer, fiberglass, nitrogen, sulfur hexafluoride, or any other insulating material. In some examples, the insulating layer 202 may be flexible. In some examples, the insulating layer 202 may include a dielectric material or a transparent material. Further, in some examples, the insulating layer 202 is configured to directly contact a user's skin (e.g., a user of the computing device 101 of FIG. 1) or may be configured such that the user can touch the insulating layer 202 (e.g., using a hand, finger, or object). In other examples, a material (e.g., a touch sensitive surface, a computing device housing, a fluid or gel, or an adhesive) may be positioned between the insulating layer 202 and the user's skin to improve the contact between the signal electrode 200 and the user's skin.

The conductive layer 204 can include any semiconductor or other conductive material, including, for example, copper, tin, iron, aluminum, gold, silver, or carbon nanotubes. In some examples, the conductive layer 204 may be flexible and/or may be transparent.

In some examples, a computing device (e.g., the computing device 101 of FIG. 1) may operate the haptic output device 118 that includes the signal electrode 200 by applying an electric signal having a voltage to the conductive layer 204, which may induce an electric charge on the conductive layer 204. The electric signal may be an AC signal. In some examples, a high-voltage amplifier may generate the AC signal.

For example, the computing device may transmit a haptic signal to an ESF controller (e.g., the ESF controller 120 of FIG. 1), which may output one or more electric signals (e.g., ESF haptic signals) to the conductive layer 204 to induce an electric charge on the conductive layer 204. The electric charge can create capacitive coupling between the conductive layer 204 and an object near or touching the signal electrode 200, for example, a user's body part, or a stylus. In such an example, the capacitive coupling may produce attractive forces between the parts of the body or the object near the signal electrode 200, which stimulate nerve endings in the skin of the user's body, for example, the user's finger. This stimulation may allow the user to perceive an ESF haptic effect (e.g., the capacitive coupling) as a vibration or other sensation. In such examples, the insulating layer 202 can electrically insulate the user from the electric charge to prevent the user from being electrocuted.

In some examples, varying the level of attraction between the object and the conductive layer 204 may vary the ESF haptic effect felt by the user (e.g., the electric charge induced on the conductive layer 204 may be varied to create various vibrations, stroking sensations, or other haptic effects). For example, a low voltage electric signal (e.g., an electric signal having a minimum voltage of approximately 100V) may be used to provide a dynamic ESF haptic effect (e.g., a change in friction) to a user as the user slides a finger across a surface associated with the computing device (e.g., the touch sensitive surface 116 of FIG. 1). As an example, an electric signal having a voltage of 100V, 220V, 300V, etc., may be used to provide the dynamic ESF haptic effect to the user as the user slides a finger across a surface associated with the computing device. In some examples, any suitable electric signal may be used to provide the dynamic ESF haptic effect to the user. As another example, a high voltage electric signal (e.g., an electric signal having a minimum voltage of approximately 1.5 kV or any suitable high voltage electric signal) may be used to provide a static ESF haptic effect (e.g., a vibration) to the user. For example, an electric signal having a voltage of 1500V, 2000V, etc., may be used to provide the static ESF haptic effect to the user. In some examples, the user may perceive the static ESF haptic effect without having to move a body part across the surface associated with the computing device. Thus, in some examples, an electric signal having a voltage of approximately 1.5 kV or more can be used to provide static ESF haptic effects or dynamic ESF haptic effects to the user. In another example, an electric signal having a voltage that is more than 100V but less than 1.5 kV may be used to provide a dynamic ESF haptic effect to the user, but may be insufficient for providing a static ESF haptic effect to the user.

In some examples, the strength of the haptic effect perceived by a user may be based on a magnitude of the voltage of the electrical signal. For example, a user may perceive a haptic effect generated from an electric signal of 1000V stronger than a haptic effect generated from an electric signal of 100V.

Referring back to FIG. 1, in some examples, the haptic output device 118 may include an ESF haptic output device as described above, as well as one or more other haptic output devices. For example, the haptic output device 118 may include one or more of a piezoelectric actuator, an electric motor, an electro-magnetic actuator, a voice coil, a shape memory alloy, an electro-active polymer, a solenoid, an ERM, or a linear resonant actuator ("LRA"). Further, in some examples, some haptic effects may utilize an actuator coupled to a housing of the computing device 101, and some haptic effects may use multiple haptic output devices of the same or different types in sequence and/or in concert.

In still another example, the haptic output device 118 may additionally include a multifunction haptic output device. The multifunction haptic output device can include a single haptic output device (e.g., a single haptic actuator) configured to output at least two different classes of haptic effects. As used herein, a haptic effect class comprises one or more haptic effects distinguished by the physical principle(s) used to generate the haptic effects (e.g., rather than the characteristics of the haptic effects actually perceived by a user). For example, a haptic effect class may comprise electrostatic haptic effects (e.g., haptic effects that may rely on electrostatic interactions between a haptic output device and a user to generate haptic effects). Another haptic effect class may comprise vibrotactile haptic effects (e.g., which may rely on mechanical vibrations to generate haptic effects). Still another haptic effect class may comprise deformation haptic effects (e.g., which may rely on physically changing a shape of a surface to generate haptic effects). Yet another haptic effect class may comprise temperature-based haptic effects (e.g., which may rely on changing a temperature of a surface contacted by a user). Still another haptic effect class may comprise electro-tactile haptic effects (e.g., which may rely on transmitting a current or voltage to a skin surface of a user). The multifunction haptic output device may be configured to output any one class of haptic effects or any combination of classes of haptic effects in response to a haptic signal.

Although in FIG. 1 a single haptic output device 118 is shown, in some examples, multiple haptic output devices 118 of the same or different type can be used to provide haptic effects. Further, in some examples, the haptic output device 118 is in communication with the processor 102 and within a housing of the computing device 101. In other examples, the haptic output device 118 is external to the computing device 101 and in communication with the computing device 101 (e.g., via wired interfaces such as Ethernet, USB, IEEE 1394, and/or wireless interfaces such as IEEE 802.11, Bluetooth, or radio interfaces). For example, the haptic output device 118 may be associated with (e.g., coupled to) a wearable device (e.g., a wristband, bracelet, hat, headband, etc.) or a handheld device (e.g., a mobile phone, smartphone, gaming device, personal digital assistant, etc.) and configured to receive haptic signals from the processor 102.

The processor 102 can execute one or more operations for operating the computing device 101. For example, the processor 102 can execute processor executable instructions 124 stored in the memory 104 to perform the operations. Non-limiting examples of the processor 102 include a Field-Programmable Gate Array ("FPGA"), an application-specific integrated circuit ("ASIC"), a microprocessor, a digital signal processor ("DSP"), etc. The processor 102 can further include programmable electronic devices such as PLCs, programmable interrupt controllers ("PICs"), programmable logic devices ("PLDs"), programmable read-only memories ("PROMs"), electronically programmable read-only memories ("EPROMs" or "EEPROMs"), or other similar devices.

In some examples, processor executable instructions 124 can configure the processor 102 to monitor the touch sensitive surface 116 via the touch sensor 108 to determine a position of a touch. For example, processor executable instructions 124 may cause the processor 102 to sample the touch sensor 108 in order to track the presence or absence of a touch and, if a touch is present, to track one or more of the location, path, velocity, acceleration, pressure and/or other characteristics of the touch over time. Processor executable instructions 124 can also cause the processor 102 to receive sensor signals from the touch sensor 108, which can correspond to the presence or absence of a touch or the location, path, velocity, acceleration, pressure, or other characteristic of the touch.

Processor executable instructions 124 can also configure the processor 102 to provide content (e.g., texts, images, sounds, videos, etc.) to a user (e.g., to a user of the computing device 101). As an example, processor executable instructions 124 can configure the processor 102 to provide an image in any format (e.g., in an animated graphics interchange format) to the user. If the content includes computer generated images, the processor 102 is configured to generate the images for display on a display device (e.g., the display 134 of the computing device or another display communicatively coupled to the processor 102). If the content includes video and/or still images, the processor 102 is configured to access the video and/or still images and generate views of the video and/or still images for display on the display device. If the content includes audio content, the processor 102 is configured to generate electronic signals that will drive a speaker, which may be part of the display device, to output corresponding sounds.

In some examples, processor executable instructions 124 can cause the processor 102 to obtain the content, or the information from which the content is derived, from the storage 114, which may be part of the computing device 101, as illustrated in FIG. 1, or may be separate from the computing device 101 and communicatively coupled to the computing device 101. In some examples, processor executable instructions 124 can cause the processor 102 to receive content from or transmit content to another device.

Processor executable instructions 124 may configure the processor 102 to analyze data to determine or select a haptic effect to generate. Particularly, processor executable instructions 124 may include code that causes the processor 102 to determine a haptic effect to output to the user. In some examples, processor executable instructions 124 may cause the processor 102 to access a look up table that includes data corresponding to various haptic effects. In some examples, the look up table may also include data corresponding to one or more events associated with each haptic effect. The processor executable instructions 124 can cause the processor 102 to access the lookup table and select one or more haptic effects included in the lookup table. In some examples, the haptic effect may include an electrostatic haptic effect. The electrostatic haptic effect can include a static ESF haptic effect or a dynamic ESF haptic effect. Determining the haptic effect may include determining the type of haptic effect and one or more parameters of the haptic effect, such as amplitude, frequency, duration, etc.

In some examples, processor executable instructions 124 can cause the processor 102 to use sensor signals (e.g., received by the processor 102 from the touch sensor 108) to select a haptic effect from a lookup table. For example, the sensor signals can indicate that a user is in constant contact with the touch sensitive surface 116. As an example, the sensor signals can indicate that the user's skin is touching the touch sensitive surface 116 over a period of time such as, for example, five seconds, ten seconds, twenty seconds, or any other length of time. The processor executable instructions 124 can cause the processor 102 to access a lookup table that includes data corresponding to an event or sensor signal, along with data indicating one or more haptic effects associated with each event or sensor signal. The processor 102 can select from the lookup table a haptic effect that corresponds to a user being in constant contact with the touch sensitive surface and select the haptic effect. Further, processor executable instructions 124 may include code that causes the processor 102 to select one or more haptic effects to provide, and/or one or more haptic output devices 118 to actuate, in order to generate or output the haptic effect. For example, a sensor signal can indicate a location of a user's touch on the touch sensitive surface 116 and the processor 102 can access a lookup table that includes data corresponding to various haptic effects, along with data corresponding to various haptic output devices for outputting each haptic effect and a location of each haptic output device. The processor 102 can select a haptic effect or a haptic output device 118 from the lookup table to output the haptic effect based on the location of the location of the user's touch. As an example, the processor executable instructions 124 can cause the processor 102 to actuate a haptic output device 118 that is located at the location of the user's touch.

In some examples, some or all of the area of the touch sensitive surface 116 may be mapped to a graphical user interface ("GUI"), for example, a GUI output on display 134. The processor executable instructions 124 may cause the processor 102 to select various haptic effects based on a location of a touch in order to output the haptic effect. As an example, a user may interact with the GUI via touch sensitive surface 116 (e.g., by tapping or making a gesture, such as a two-finger pinch or one-finger scroll, on the touch sensitive surface 116), the processor 102 may access a lookup table or database that includes data corresponding to various haptic effects, along with data indicating corresponding interactions or locations of interactions and select different haptic effects based on the location of the interaction.

Processor executable instructions 124 may include code that causes the processor 102 to determine a haptic effect based on an event. An event, as used herein, includes any interaction, action, collision, or other event which occurs during operation of the computing device 101, which can potentially include an associated haptic effect. In some examples, an event may include user input (e.g., a button press, manipulating a joystick, interacting with a touch sensitive surface 116, tilting or orienting the device), a system status (e.g., low battery, low memory, or a system notification, such as a notification generated based on the system receiving a message, an incoming phone call, a notification, or an update), sending data, receiving data, or a program event (e.g., if the program is a game, a program event may include explosions, gunshots, collisions, interactions between game characters, advancing to a new level, driving over bumpy terrain, etc.). For example, the computing device 101 can receive an e-mail from another computing device (e.g., via network interface device 110) and generate a notification based on the received e-mail. The processor 102 can access a look up table that includes various haptic effects and select a haptic effect that corresponds to a received e-mail.

In some examples, the processor executable instructions 124 may cause the processor 102 to determine a haptic effect based at least in part on sensor signals received from the touch sensor 108 or sensor 132. For example, the touch sensor 108 can detect a touch of an object (e.g., the skin of a user on the computing device 101 or a stylus) on a surface associated with the computing device 101 (e.g., the touch sensitive surface 116) and transmit a sensor signal to the processor 102 in response to detecting the touch. The processor 102 can determine that the object is touching the surface based on the sensor signal. The processor executable instructions 124 may cause the processor to access a lookup table or database that includes data corresponding to various sensor signals, along with data indicating one or more haptic effects associated with each sensor signal and select one or more haptic effects based on the object touching the surface. In some examples, the processor 102 can receive multiple sensor signals over a period of time and determine that the object is in constant contact with the surface. For example, the processor 102 can receive multiple sensor signals over a short period of time (e.g., two seconds, five seconds, etc.), a longer period of time (e.g., ten seconds, fifteen seconds, etc.) or any other length of time and determine that the object is in constant contact with the surface. As an example, the touch sensor 108 may detect the touch of the object over the period of time and periodically (e.g., five milliseconds, 10 milliseconds, etc.) transmit a sensor signal that indicates that a touch is detected to the processor 102 and the processor 102 can determine that the object is in constant contact with the surface based on the sensor signals. The processor executable instructions 124 may cause the processor to access the lookup table or database and select one or more haptic effects based on the object being in constant contact with the surface.

The processor executable instructions 124 may also cause the processor 102 to determine a haptic effect in response to an event as described above and in response to determining that the object is constantly touching the surface. For example, the computing device 101 can be a smartwatch worn by a user and the touch sensor 108 can be attached to a surface of a band of the smartwatch. The touch sensor 108 can detect contact between the user's skin and the surface of the band. The computing device 101 can receive an e-mail from another computing device and one or more sensor signals from touch sensor 108 and determine that the object is in constant contact with the surface based on the sensor signals. The processor executable instructions 124 can cause the processor 102 to access one or more lookup tables that include data corresponding to an event or a sensor signal, along with data indicating one or more haptic effects associated with each event and sensor signal. The processor 102 can select an electrostatic haptic effect (e.g., a static ESF haptic effect) from the lookup table based on the computing device 101 receiving the e-mail and the object being in constant contact with the surface. In some examples, the electrostatic haptic effect can be output to the user to indicate to the user that the computing device 101 has received the e-mail and the user can perceive the electrostatic haptic effect.

In some examples, the processor 102 may receive sensor signals from the touch sensor 108 and determine a track, path, velocity, acceleration, pressure, or other characteristic of an object touching the surface to which the haptic output device 118 is attached. In such an example, processor executable instructions 124 may cause the processor to determine another haptic effect based at least in part on the determined track, path, velocity, acceleration, or pressure. For example, processor executable instructions 124 can cause the processor 102 to select another electrostatic haptic effect (e.g., a dynamic ESF haptic effect) based on the track, path, velocity, acceleration, or pressure of the object, which can be output to the user to provide information to the user.

As an example, the computing device 101 can be a smartwatch worn by a user and the touch sensor 108 can be coupled to a surface of a band of the smartwatch to detect a velocity or acceleration of a user's touch across the surface of the band. The processor 102 can receive data corresponding to an e-mail notification. The processor 102 also receives sensor signals from the touch sensor 108 and determines that the user is sliding a finger or hand across the surface of the band (e.g., based on a velocity of the contact of the user's finger or hand on the surface of the band). The processor executable instructions 124 can cause the processor 102 to access a lookup table or database that include data corresponding to one or more events or sensor signals, along with data indicating one or more haptic effects associated with each event or sensor signal and the processor 102 can select a dynamic ESF haptic effect (e.g., a smooth texture) that corresponds to the user sliding a finger or hand across the surface of the band. The dynamic ESF haptic output effect can be output to the surface of the band to which the haptic output device 118 is attached such that the user perceives the dynamic ESF haptic effect as the user's finger or hand slides across the surface of the band. As another example, haptic effects may be selected based on the acceleration of the object (e.g., a strong vibration if the acceleration of the user's finger sliding across the surface is high or a weaker vibration if the acceleration is low).

In some examples, the processor executable instructions 124 can cause the processor to determine a haptic effect configured to provide a user with information. For example, the processor executable instructions 124 may cause the processor 102 to determine a haptic effect that may be configured to communicate information to the user (e.g., that the user has a missed phone call, text message, e-mail, instant message, a level of urgency associated with a missed phone call, text message, e-mail, and/or other communication). For example, the processor executable instructions 124 can cause the processor 102 to access a lookup table or database that includes data corresponding to a type of information to be communicated to the user, along with data indicating one or more haptic effects associated with the type of information. The processor 102 can select a dynamic ESF haptic effect (e.g., a smooth texture) to be output to the surface of the band of the smartwatch to which the haptic output device 118 is attached such that the user perceives the dynamic ESF haptic effect as the user's finger or hand slides across the touch sensitive portion, which may indicate a level of urgency of the e-mail notification (e.g., that the e-mail is not very urgent).

In some examples, the processor executable instructions 124 may include code that causes the processor 102 to determine, based on a location of a touch on the touch sensitive surface 116, a haptic effect to output and code that causes the processor 102 to select one or more haptic effects to provide in order to simulate the effect. For example, the processor 102 can access a lookup table or database that includes data corresponding to various locations on the touch sensitive surface 116, along with data indicating a corresponding haptic effect for each location. The processor 102 can select different haptic effects based on the location of a touch in order to simulate the presence of a virtual object (e.g., a virtual piece of furniture, automobile, animal, cartoon character, button, lever, logo, or person) on the display 134. Further, in some examples, processor executable instructions 124 may include code that causes the processor 102 to determine, based on the size, color, location, movement, and/or other characteristics of a virtual object, a haptic effect to output and code that causes the processor 102 to select one or more haptic effects to provide in order to simulate the effect. For example, haptic effects may be selected based on the size of a virtual object (e.g., a strong vibration if the virtual object is large, and a weaker vibration if the virtual object is small). In such examples, the haptic effects may include one or more of an electrostatic haptic effect, a vibrotactile haptic effect, a deformation haptic effect, a temperature-based haptic effect, or an electro-tactile haptic effect.

The processor executable instructions 124 may also include programming that causes the processor 102 to generate and transmit haptic signals to the haptic output device 118 to generate the selected haptic effect. In some examples, processor executable instructions 124 causes the haptic output device 118 to generate a haptic effect determined by the processor 102. For example, the processor executable instructions 124 may cause the processor 102 to access stored waveforms or commands to send to the haptic output device 118 to create the selected haptic effect. For example, the processor executable instructions 124 can cause the processor 102 to access a lookup table that includes data indicating one or more haptic signals associated with one or more haptic effects and determine a waveform to transmit to haptic output device 118 to generate a particular haptic effect. In some examples, the processor executable instructions 124 may include algorithms that can be used to determine target coordinates for the haptic effect (e.g., coordinates for a location on the computing device 101, such as on the touch sensitive surface 116, at which to output the haptic effect). For example, the processor executable instructions 124 may cause the processor 102 to use a sensor signal indicating a location of a touch of an object on the touch sensitive surface 116 to determine target coordinates for the haptic effect, which may correspond to the location of the touch.

Figure 3:
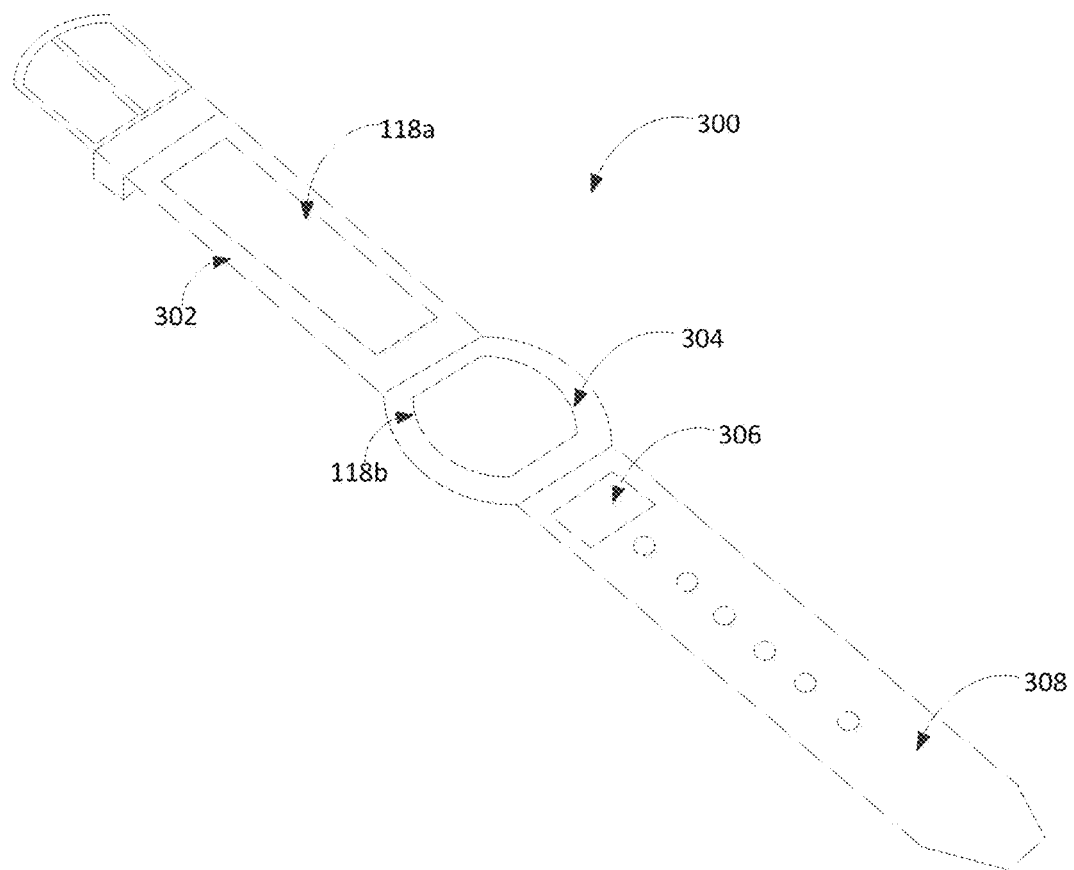
FIG. 3 shows an example of a system for providing electrostatic haptic feedback via a wearable device according to one example.

FIG. 3 shows an example of a system for providing electrostatic haptic feedback via a wearable device. In the example shown in FIG. 3, the system includes a computing device 300 that is a wearable device (e.g., a smartwatch). In some examples, haptic output devices 118a-b are coupled to a surface 302, 304 associated with the computing device 300. For example the haptic output device 118a can be glued, stitched, or taped to the surface 302 (e.g., a band of the smart watch). As another example, a conductive layer of the haptic output device 118b (e.g., the conductive layer 204 of FIG. 2) can be deposited on the surface 304. For example, conductive paint that includes the conductive layer can be deposited on the surface 304. In such examples, an insulating layer of the haptic output device 118b (e.g., the insulating layer 202 of FIG. 2) can be deposited or positioned on or proximate to the conductive layer or on the surface 304 such that the insulating layer covers the conductive layer.

The haptic output devices 118a-b can be embedded within the computing device 300 or surface 302, 304 associated with the computing device 300. For example, the haptic output device 118a can be embedded within the surface 302 (e.g., embedded within a band of a smartwatch). As another example, the haptic output device 118b can be embedded within an outer casing and/or housing of the computing device 300.

In some examples, the haptic output device 118a-b can include at least a portion of the computing device 300. For example, a conductive layer of the haptic output device 118a can include a portion of the surface 302 (e.g., include a portion of the band of the smartwatch) and an insulating layer of the haptic output device 118a can be positioned on or proximate to the conductive layer to cover the conductive layer.

In some examples, a ground electrode 306 may also be coupled to the computing device 300. For example, the ground electrode 306 may be coupled to a surface 308 associated with the computing device 300 (e.g., a band of the smartwatch) or any surface associated with the computing device 300 (e.g., surface 302, 304). A ground electrode may include a ground electrode conductive layer, which can be configured in substantially the same manner as conductive layer 204 of FIG. 2.

In some examples, a gel or liquid can be coupled to the ground conductive layer (e.g., positioned on or proximate to the ground conductive layer). In some examples, the gel or liquid can be a conductive gel or a conductive liquid. In such examples, the ground electrode may include the gel or liquid. In other examples, the gel or liquid may be formed on the ground conductive layer. As an example, the gel or liquid may be formed by a chemical reaction when the computing device 300 is worn or held by a user and may become coupled to the ground electrode conductive layer as the gel or liquid is formed. As another example, the computing device 300 may include a dispensing device (e.g., a pump) configured to form and/or dispense the gel or liquid on or proximate to the ground electrode conductive layer such that the gel or liquid becomes coupled to the ground electrode conductive layer. In some examples, the ground electrode may include a gel pad that includes the ground conductive layer and the gel or liquid coupled to the ground conductive layer. In some examples, the ground electrode 306 may include a ground electrode insulating layer, which may be configured in substantially the same manner as insulating layer 202 of FIG. 2 and may be coupled to the ground electrode conductive layer. In some examples, the ground electrode 306 may not include a gel or liquid and the ground electrode insulating layer may be coupled to the ground electrode conductive layer. In some examples, coupling the ground electrode 306 to the computing device 300 may amplify or increase a perceived strength of an ESF haptic effect (e.g., a static ESF haptic effect or a dynamic ESF haptic effect) output by the haptic output devices 118a-b.

Although the example depicted in FIG. 3 shows a ground electrode 306 coupled to the computing device 300, in some examples, the ground electrode 306 may not be coupled to the computing device 300 (e.g., the computing device 300 may not include a ground electrode 306). Further, although two haptic output devices 118a-b are shown in FIG. 3, some examples may use any number of haptic output devices 118 positioned on or coupled to a surface associated with the computing device 300.

Figure 4A:
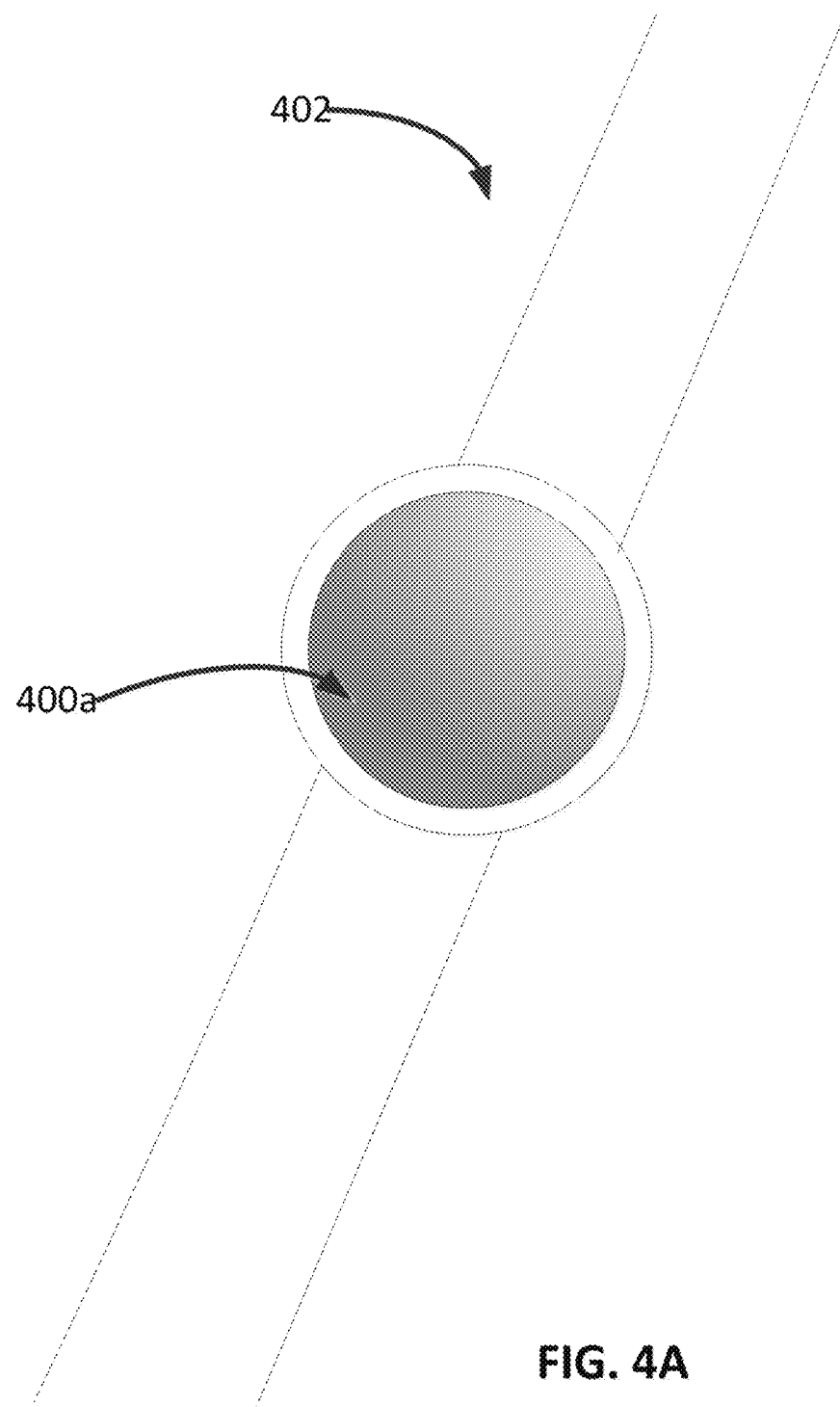
FIGS. 4A-B show another example of a system for providing electrostatic haptic feedback via a wearable device according to one example.
Figure 4B:
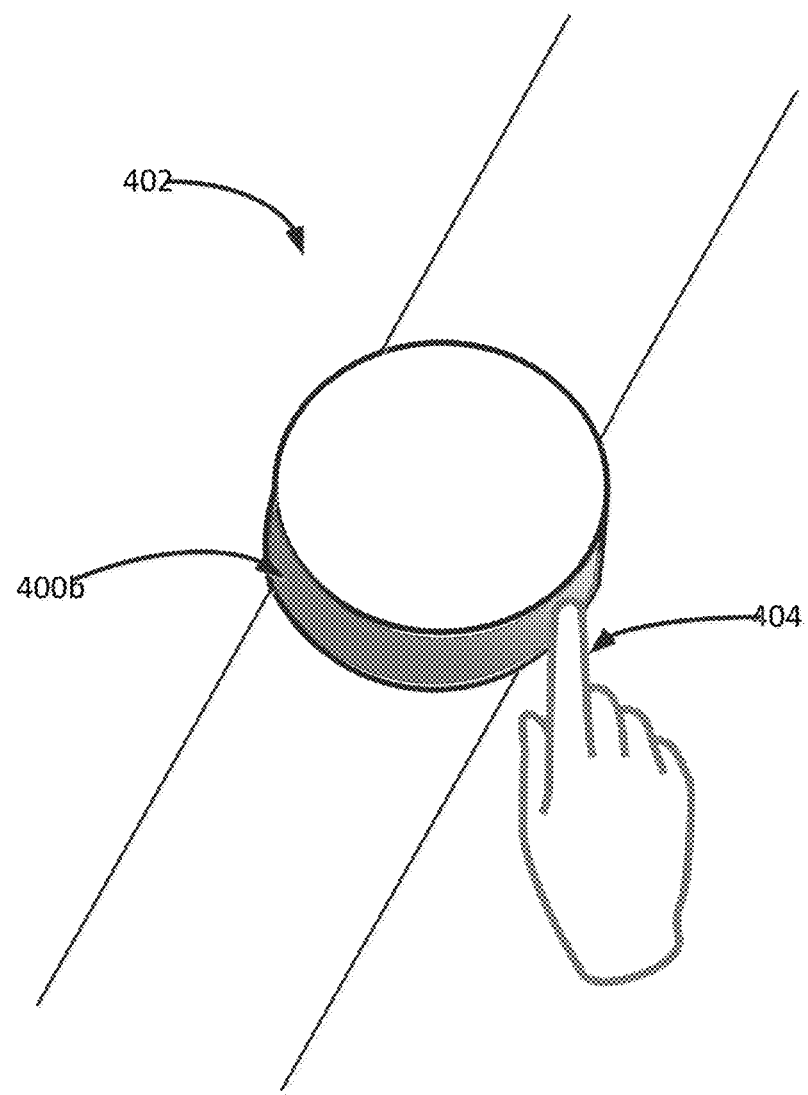

In some examples, a haptic output device can be coupled to a surface associated with the computing device 300 and configured to output an ESF haptic effect to the surface. For example, FIGS. 4A-B show another example of a system for providing electrostatic haptic feedback via a wearable device according to one example. In the example depicted in FIGS. 4A-B, haptic output devices 400a-b are coupled to surfaces associated with the computing device 402, which is a smartwatch. In this example, haptic output device 400a is coupled to a first surface of the computing device 402 (e.g., the bottom of a casing of the smartwatch) and haptic output device 400b is coupled to a second surface of the computing device 402 (e.g., a side of the casing of the smartwatch). In some examples, the haptic output device 400a can be coupled to the first surface of the computing device 402 such that the skin of a user of the computing device 402 can be in constant contact with the haptic output device 400a. For example, coupling the haptic output device 400a to the bottom of a casing of the smartwatch may allow the haptic output device 400a to be in constant contact with the skin of a user wearing the smartwatch. In some examples, the haptic output device 400b can be coupled to the second surface of the computing device 402 such that a user of the computing device 402 can contact the haptic output device 400b. As an example, the haptic output device 400b can be coupled to the side of the casing of the smartwatch such that a user of the smartwatch can touch the haptic output device 400b with the user's hand, finger 404, or an object (e.g., a stylus).

The haptic output devices 400a-b can output a haptic effect, which can be perceived by a user of the computing device 402. For instance, haptic output device 400a can output a static ESF haptic effect (e.g., a vibration) to the first surface of the computing device 402 in response to an event (e.g., an incoming call) and the user may perceive the static ESF haptic effect when the user is in constant contact with the first surface (e.g., when the user is wearing the computing device 402). As another example, haptic output device 400b can output a dynamic ESF haptic effect (e.g., a simulated texture) to the second surface and the user may perceive the dynamic ESF haptic effect when the user slides a finger 404 across the second surface. In some examples, the haptic output device 400b can output the dynamic ESF haptic effect to indicate or communicate information to the user of the computing device 400. For example, the haptic output device 400a outputs a static ESF haptic effect (e.g., a vibration) to the first surface in response to a notification (e.g., an e-mail notification) and the user may slide a finger 404 across the second surface and haptic output device 400b can output a dynamic ESF haptic effect (e.g., a smooth texture), which may indicate to the user that the e-mail notification is not urgent. In some examples, the haptic output device 400b can also output a static ESF haptic effect. In another example, each of the haptic output devices 400a-b can output a static ESF haptic effect or a dynamic ESF haptic effect. In still another example, the haptic output devices 400a-b can be combined to form a single haptic output device that can output static ESF haptic effects or dynamic ESF haptic effects.

In some examples, the computing device 402 may include a sensor (e.g., touch sensor 108) and the haptic output devices 400a-b can output a haptic effect based on sensor signals. For example, the sensor may detect an object (e.g., a user's skin, finger, hand, or a stylus) touching a surface associated with the computing device and transmit sensor signals associated with the touch to a processor associated with the computing device 402 (e.g., the processor 102 of FIG. 1). The sensor signal can correspond to an amount of pressure, a location, a velocity, or an acceleration of the touch. The computing device 402 may determine and output one or more haptic effects (e.g., via the haptic output devices 400a-b) based at least in part on the sensor signals. For example, the computing device 402 may receive sensor signals and determine that the object is not moving (e.g., when the user is wearing the computing device 402 and the user's skin is in constant contact with a surface associated with the computing device 402). The computing device 402 may output a static ESF haptic effect (e.g., a vibration via haptic output device 400a) to a body part of the user in response to an event (e.g., an incoming call) and in response to determining that the object is not moving and the user may perceive the static ESF haptic effect. As another example, the computing device 402 may receive sensor signals and determine that the object is moving (e.g., when a user is sliding a finger 404 or a stylus across a surface associated with the computing device 402). The computing device 402 may output a dynamic ESF haptic effect (e.g., a simulated texture or a perceived coefficient of friction) in response to determining that the object is moving and the dynamic ESF haptic effect may be used to communicate information to the user as described above.

Figure 5:
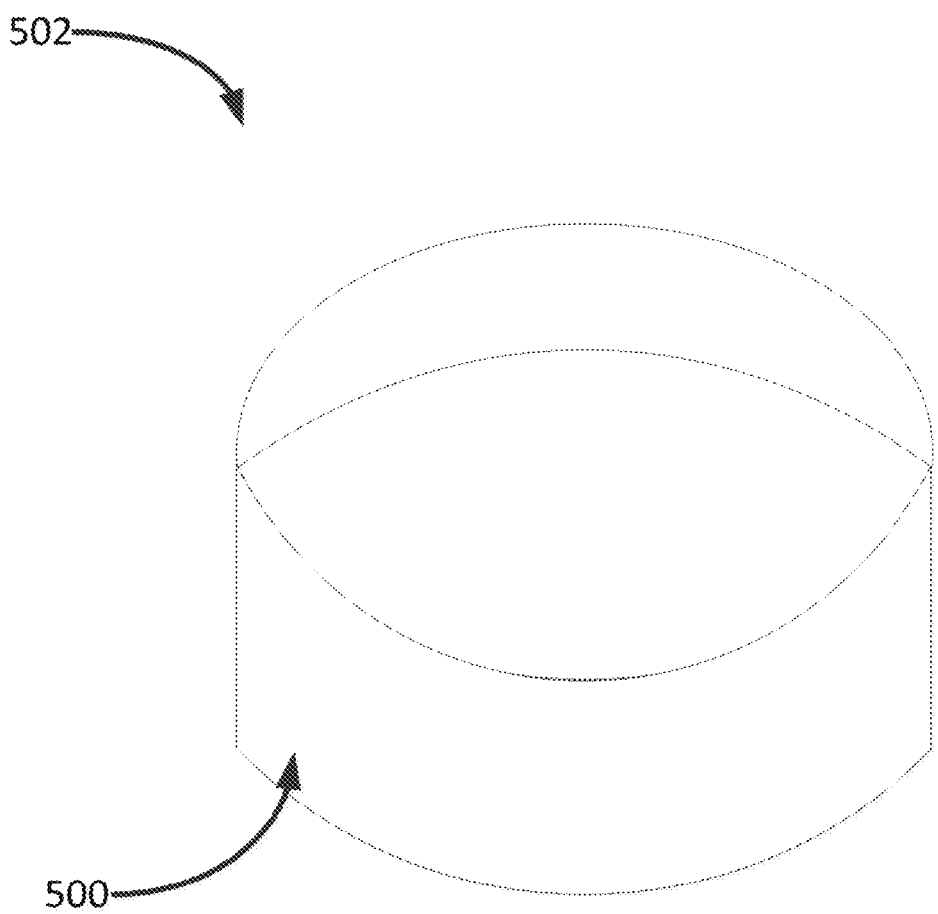
FIG. 5 shows another example of a system for providing electrostatic haptic feedback via a wearable device according to one example.

Although, two haptic output devices 400a-b are shown in FIG. 4, some examples may use fewer or more haptic output devices of the same or different type, in series or in concert, to produce haptic effects. For example, FIG. 5 shows another example of a system for providing electrostatic haptic feedback via a wearable device according to one example. In the example depicted in FIG. 5, a haptic output device 500 is attached to a surface of a wearable device 502. The haptic output device 500 can be configured to output a static ESF haptic effect that a user of the wearable device 502 may perceive when the user's skin is in constant contact with the haptic output device 500. In this example, the haptic output device 500 can also be configured to output a dynamic ESF haptic effect that can be perceived by the user when the user slides an object (e.g., a hand, finger, or stylus) across the surface of the wearable device 502 to which the haptic output device 500 is attached.

Figure 6:
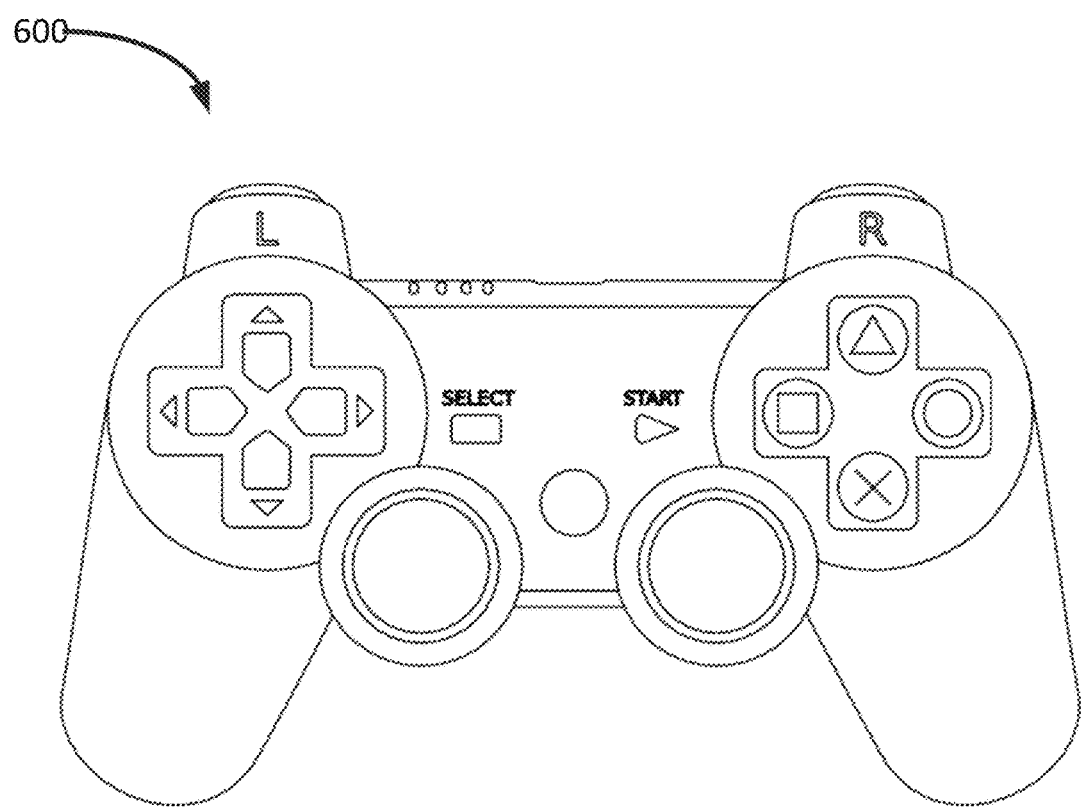
FIG. 6 show an example of a system for providing electrostatic haptic feedback via a handheld device according to one example.

In some examples, a haptic output device can be coupled to a handheld device for providing electrostatic haptic feedback. For example, FIG. 6 shows an example of a system for providing electrostatic haptic feedback via a handheld device according to one example. In the example depicted in FIG. 6, a handheld device 600 may include a device that can be held or grasped (e.g., by a user). For example, in some examples, the handheld device 600 may include a game system controller, a steering wheel, a mobile device, a tablet, an e-reader, a laptop, a game-pad, a joystick, a button, a stylus, a remote control, a mouse, a keyboard, etc. The handheld device 600 may be a standalone device or may be communicatively coupled to another device (e.g., a video game system). In some examples, the handheld device 600 may be configured such that the handheld device 600 can contact portion of a user's hand, for example, the user's fingertips, palm, fingers, etc. In some examples, a haptic output device may be coupled to a surface associated with the handheld device 600 (e.g., on a button or surface of the handheld device, embedded within the handheld device 600, include a portion of a housing and/or casing of the handheld device 600, etc.) to output a haptic effect that may be perceived by the user.

The handheld device 600 may include one or more sensors (e.g., touch sensor 108 or sensor 132). For example, in some examples, the entire surface or apportion of the surface associated with the handheld device 600 may include one or more sensors. In some examples, the handheld device 600 can output haptic effects via the haptic output device coupled to the surface associated with the handheld device 600 based at least in part on signals from the sensors. For example, sensor signals may indicate that a user is contacting a portion of the surface of the handheld device 600. In some examples, the handheld device 600 may output a static ESF haptic effect in response to an event (e.g., an event in a video game being played by the user via the handheld device 600) and the user can perceive the static ESF haptic effect as a change in the perceived coefficient of friction, a simulated vibration, or a simulated texture at the user's fingertip or palm as the user grasps or manipulates the handheld device 600.

In some examples, sensor signals may correspond to an amount of pressure, direction, velocity, or acceleration of the user's contact with the portion of the surface of the handheld device 600 to which the haptic output device is coupled. In some examples, the handheld device 600 may output a dynamic ESF haptic effect (e.g., perceived coefficient of friction or a simulated texture) based on the pressure, direction, velocity, or acceleration of the user's contact. For example, the handheld device 600 may output the dynamic ESF haptic effect in response to determining that the user is sliding a finger across a portion of the surface of the handheld device 600 and the dynamic ESF haptic effect may communicate information to the user (e.g., provide the user with information associated with a video game being played by the user via the handheld device 600).

Figure 7:
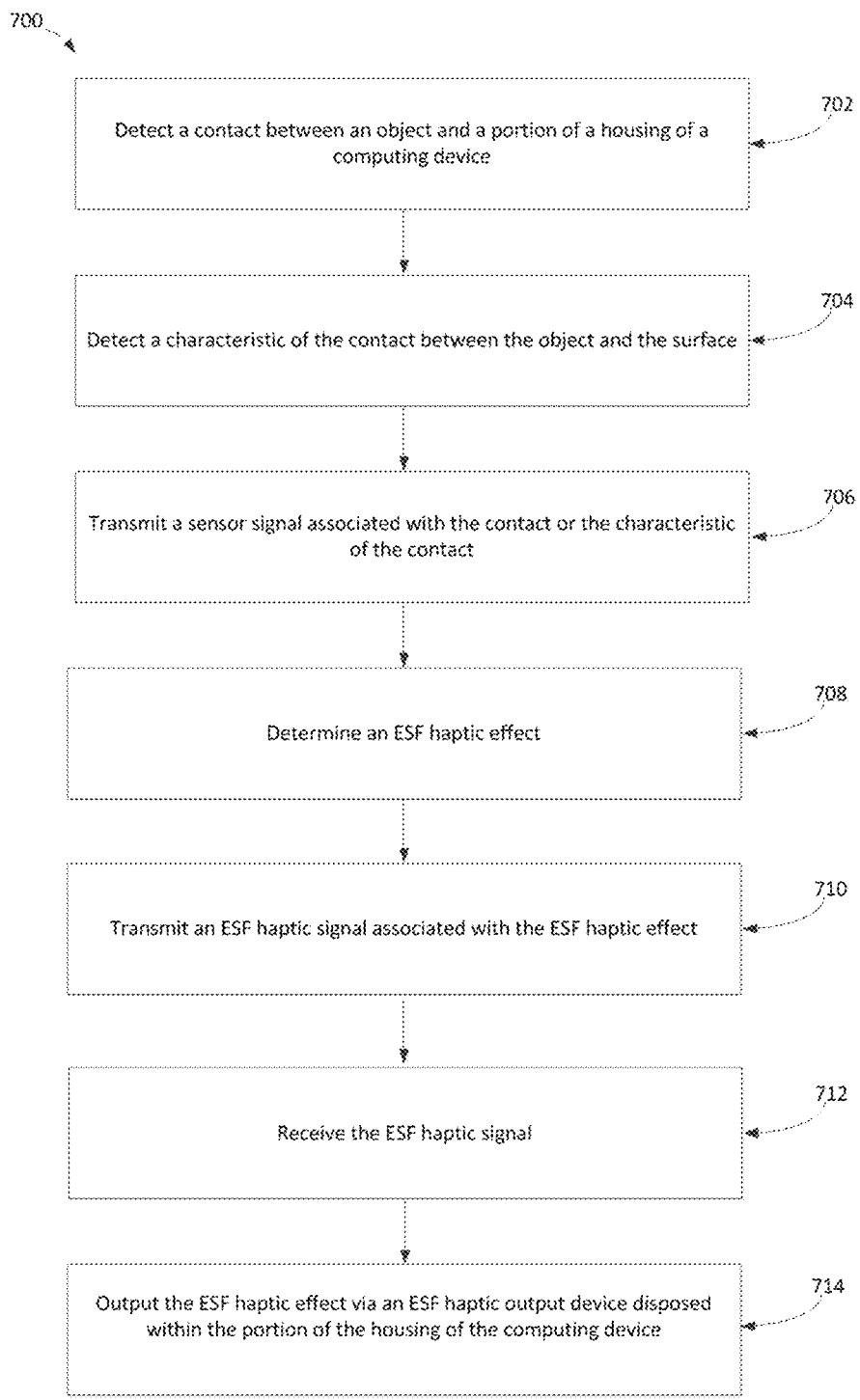
FIG. 7 is a flow chart of steps for performing a method for providing electrostatic haptic feedback via a wearable or handheld device according to one example.

Illustrative Methods for Providing Electrostatic Haptic Feedback Via a Wearable Computing Device or a Handheld Computing Device FIG. 7 is a flow chart of steps for performing a method for providing electrostatic haptic feedback via a wearable or handheld device according to one example. In some examples, the steps in FIG. 7 may be implemented in program code that is executable by a processor, for example, the processor in a general purpose computer, a mobile device, or a server. In some examples, these steps may be implemented by a group of processors. In some examples, one or more steps shown in FIG. 7 may be omitted or performed in a different order. Similarly, in some examples, additional steps not shown in FIG. 7 may also be performed.

The steps below are described with reference to components described above with regard to the systems shown in FIGS. 1 and 3.

The method 700 begins at step 702 when a contact between an object (e.g., a user's hands, finger or skin, or a stylus) and a surface 302, 304 associated with a computing device 300 is detected. In some examples, the touch sensor 108 or sensor 132 can detect the contact between the object and the surface 302, 304. In some examples, the touch sensor 108 or sensor 132 may include an ambient light sensor, a pressure sensor, a force sensor, a capacitive sensor, a touch sensor, etc., for detecting the contact.

The method continues at step 704 when a characteristic of the contact between the object and the surface 302, 304 is detected. In some examples, the touch sensor 108 or sensor 132 detects the characteristic of the contact. The characteristic of the contact can include a location, path, velocity, acceleration, pressure or other characteristics of the contact. For example, the touch sensor 108 can detect contact between a user's finger and the surface 302 associated with the computing device 300 and detect a velocity of the contact.

The method continues at step 706 when sensor signal associated with the contact or the characteristic of the contact is transmitted. In some examples, the touch sensor 108 or 132 transmits the sensor signal to the processor 102. The sensor signal can indicate a presence, absence, location, path, velocity, acceleration, pressure or other characteristic of the contact. In some examples, the sensor signal can indicate the presence, absence, location, path, velocity, acceleration, pressure or other characteristic of the contact over a period of time (e.g., ten seconds). In some examples, the touch sensor 108 or 132 transmits the sensor signal to the processor 102 periodically over the period of time (e.g., every 10 milliseconds). The sensor signal may include an analog or a digital signal. In some examples, the sensor may only transmit a sensor signal upon sensing an event, such as a touch or a movement.

The method continues at step 708 when the processor 102 determines an ESF haptic effect. In some examples, the processor 102 can execute operations to determine the ESF haptic effect. In some examples, the ESF haptic effect can include one or more haptic effects (e.g., textures, vibrations, change in perceived coefficient of friction, stroking sensations, and/or stinging sensations). The ESF haptic effect can include a static ESF haptic effect or a dynamic ESF haptic effect. In some examples, the processor 102 may determine the ESF haptic effect based at least in part on an event, or sensor signals received from the touch sensor 108 or sensor 132. For example, the processor 102 may determine the ESF haptic effect based on a text message received by the computing device 300). As another example, the processor 102 may determine the ESF haptic effect based on a sensor signal indicating the presence, absence, location, path, velocity, acceleration, pressure or other characteristic of a contact between an object and the surface 302, 304. (e.g., a sensor signal transmitted in step 706).

For example, one or more look up tables or databases can include data corresponding to one or more events or sensor signals, along with data indicating one or more ESF haptic effects associated with each event or sensor signal. The processor 102 can access the look up tables or databases to select an ESF haptic effect associated with an incoming call notification on the computing device 300. In some examples, if a sensor signal received by the processor indicates a contact between the user's skin and the surface 304, the processor 102 can further select a static ESF haptic effect (e.g., a simulated vibration) that is associated with a contact between the user's skin and the surface 304. The static ESF haptic effect can be perceived by the user when the user's skin is in constant contact with the surface 304 (e.g., when the user is wearing the computing device 300). As another example, the processor 102 can receive sensor signal indicating a path, velocity, or acceleration of an object (e.g., the user's finger or a stylus) contacting the surface 302 associated with the computing device 300. The processor 102 can determine that a user is sliding the object across the surface 302 based on the sensor signal and select an ESF haptic effect (e.g., a dynamic ESF haptic effect) in response to determining that the user is sliding the object across the surface 302.

In some examples, the processor 102 may determine the ESF haptic effect based on activity associated with an electronic game (e.g., a game played on a tablet, computer, or dedicated gaming system such as a console). For example, the computing device 101 is a handheld device (e.g., a video game controller) associated with the electronic game. In some examples, the ESF haptic effect may be associated with an event occurring in the electronic game (e.g., a collision in the electronic game) or the ESF haptic effect may be used to communicate information to a user. In one such example, the user may use the computing device 101 to control a vehicle in the electronic game and an ESF haptic effect may vary based on a terrain over which the vehicle is driving (e.g., the ESF haptic effect can be an intense vibration if the terrain is rough). As another example, the ESF haptic effect may indicate a condition of the vehicle. For example, the ESF haptic effect may be a texture that can be perceived by the user and a roughness of the texture may vary based on damage sustained by the vehicle. As an example, the texture may be smooth when the vehicle is undamaged, but the texture may become increasingly rough based on damage to or destruction of the vehicle.

In some examples, the processor 102 may determine the ESF haptic effect based on an event such as, for example, any interaction, action, collision, or other event which occurs during operation of the computing device 101, which can potentially include an associated haptic effect. In some examples, an event may include user input (e.g., a button press, manipulating a joystick, interacting with a touch sensitive surface 116, tilting or orienting the device), a system status (e.g., low battery, low memory, or a system notification, such as a notification generated based on the system receiving a message, an incoming phone call, a notification, or an update), sending data, receiving data, or a program event (e.g., if the program is a game, a program event may include explosions, gunshots, collisions, interactions between game characters, advancing to a new level, driving over bumpy terrain, etc.). For example, the computing device 101 can receive an incoming call from another computing device and generate a notification based on the incoming call. The processor 102 can access a look up table that includes various haptic effects and select an ESF haptic effect that corresponds to an incoming call. In such examples, the processor 102 can determine the ESF haptic effect in the absence of sensor signals (e.g., if the computing device 101 does not include the touch sensor 108 or sensor 132).

The method 700 continues at step 710 when an ESF haptic signal associated with the ESF haptic effect is transmitted. In some examples, the processor 102 transmits the ESF haptic signal. In some examples, the processor 102 transmits the ESF haptic signal to an ESF controller 120 or a haptic output device 118.

The method 700 continues at step 712 when the ESF haptic signal is received. In some examples, the ESF controller 120 receives the ESF haptic signal. In some examples, the ESF haptic signal may include a digital or an analog signal. In some examples, the ESF controller 120 may perform analog-to-digital conversion of the ESF haptic signal. In some examples, the ESF controller 120 may amplify, invert, or otherwise modify the ESF haptic signal received.

In some examples, the ESF controller 120 is configured to generate or determine one or more static ESF haptic signals or dynamic ESF haptic signals to be output to a haptic output device 118 based at least in part on the ESF haptic signal, and then transmit the static ESF haptic signal or a dynamic ESF haptic signal to the haptic output device 118. In some examples, the ESF controller 120 can amplify the haptic signal to generate the static ESF haptic signal or a dynamic ESF haptic signal.

The ESF controller 120 may include a processor or a microcontroller. The processor or microcontroller may rely on programming contained in memory to determine the static ESF haptic signal or the dynamic ESF haptic signal to output to the haptic output device 118. In some examples, the programming contained in the memory may include a lookup table. In some examples, the processor or microcontroller may use the lookup table to determine the static ESF haptic signal or the dynamic ESF haptic signal to output based on information received in the ESF haptic signal. For example, the processor or microcontroller may compare information received in the ESF haptic signal to information in the lookup table and select the static ESF haptic signal or the dynamic ESF haptic signal based on the comparison (e.g., select a static ESF haptic signal or dynamic ESF haptic signal that corresponds to the ESF haptic signal).

The method 700 continues at step 714 when an ESF haptic output device 118a-b coupled to the surface 302, 304 associated with the computing device 300 outputs the ESF haptic effect. In some examples, the ESF haptic output device 118a-b receives an ESF haptic signal and outputs the ESF haptic effect. In some examples ESF haptic effect includes a simulated vibration, a change in a perceived coefficient of friction, or a simulated texture that can be perceived by a user of the computing device 300.

In some examples, the ESF haptic output device 118a-b includes an insulator coupled to a conductor. The ESF haptic signal includes an electric signal that is applied to the conductor, which induces a charge in the conductor. The electric signal can be an AC signal or AC voltage that, in some examples, may be generated by a high-voltage amplifier or any power source. In some examples, the charge on the conductor may capacitively couple the conductor with an object near or touching the ESF haptic output device 118a-b (e.g., an object near or touching the surface 302, 304 to which the ESF haptic output device 118a-b is coupled). The capacitive coupling may, in some examples, result in the user perceiving the haptic effect.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A device comprising:
    a housing;
    a computing device disposed in the housing, the computing device comprising a memory and a processor communicatively coupled to the memory;
    a touch sensor communicatively coupled to the processor and configured to detect one or more movements of one or more contacts on the housing and one or more speeds of the one or more contacts on the housing and transmit a touch sensor signal associated with a detected one or more movements of the one or more contacts and a detected one or more speeds of the one or more contacts to the processor;
    a first electrostatic force ("ESF") haptic output device disposed within a portion of the housing and in communication with the computing device, the first ESF haptic output device configured to output a static ESF haptic effects; and
    a second ESF haptic output device disposed within the housing and in communication with the computing device, the second ESF haptic output device configured to output a dynamic ESF haptic effects, wherein the processor is configured to determine the static ESF haptic effects and the dynamic ESF haptic effects in response to the detected one or more movements of the one or more contacts and the detected one or more speeds of the one or more contacts, and wherein the first ESF haptic output device comprises:
        a first conductive layer electrically coupled to a voltage source; and
        a first insulation layer disposed on the first conductive layer to prevent contact between a user and the first conductive layer, and wherein the second ESF haptic output device comprises:
        a second conductive layer electrically coupled to the voltage source; and
        a second insulation layer disposed on the second conductive layer to prevent contact between the user and the second conductive layer.

2. The device of claim 1, wherein the first ESF haptic output device and the second ESF haptic output device comprise a single ESF haptic output device disposed within the housing.

3. The device of claim 1, wherein the device is a wearable device.

4. The device of claim 1, wherein the device is a handheld device.

5. The device of claim 1, wherein the processor is configured to:
    determine a first ESF haptic effect and transmit a first ESF haptic signal to the first ESF haptic output device, the first ESF haptic effect comprising a static ESF haptic effect; and
    determine a second ESF haptic effect and transmit a second ESF haptic signal to the second ESF haptic output device, the second ESF haptic effect comprising a dynamic ESF haptic effect.

6. The device of claim 1, wherein the housing has an outer surface and wherein the first ESF haptic output device and the second ESF haptic output device are disposed on the outer surface of the housing.

7. The device of claim 1, wherein the first ESF haptic output device is configured to output a static ESF haptic effect at a first location on the portion of the housing and the second ESF haptic output device is configured to output a dynamic ESF haptic effect at a second location on the portion of the housing.

8. The device of claim 7, wherein the processor is configured to:
    determine a first ESF haptic effect and transmit a first ESF haptic signal to the first ESF haptic output device, the first ESF haptic effect comprising the static ESF haptic effect; and
    determine a second ESF haptic effect and transmit a second ESF haptic signal to the second ESF haptic output device, the second ESF haptic effect comprising the dynamic ESF haptic effect.

9. The device of claim 8, wherein the touch sensor is-configured to detect one or more contacts at the first and second locations and transmit a touch sensor signal associated with a detected one or more contacts to the processor and wherein the processor is configured to:
    in response to the detected one or more contacts at the first location, determine the first ESF haptic effect based on the detected one or more contacts at the first location; and
    in response to the detected one or more contacts at the second location, determine the second ESF haptic effect based on the detected one or more contacts at the second location.

10. The device of claim 9, wherein the processor is configured to:
    in response to the detected one or more movements of the one or more contacts and the detected one or more speeds of the one or more contacts at the first location, determine the first ESF haptic effect based at least in part on the detected one or more movements of the one or more contacts and the detected one or more speeds of the one or more contacts at the first location; and
    in response to the detected one or more movements of the one or more contacts and the detected one or more speeds of the one or more contacts at the second location, determine the second ESF haptic effect based at least in part on the detected one or more movements of the one or more contacts and the detected one or more speeds of the one or more contacts at the second location.

11. The device of claim 1, further comprising a ground electrode coupled to the housing, the ground electrode comprising a ground electrode conductive layer and wherein the ground electrode is exposed and contactable by the user.

12. The device of claim 11, wherein the ground electrode further comprises a ground electrode insulation layer or a conductive gel, wherein the ground electrode insulation layer or the conductive gel is coupled to the ground electrode conductive layer.

13. A method comprising:

detecting one or more contacts on a housing of a computing device at a first location and a second location;

detecting characteristics of the one or more contacts, the detected characteristics including one or more movements or one or more speeds of the one or more contacts;

transmitting a sensor signal associated with a detected one or more contacts or the detected characteristics;

receiving a sensor signal indicating the one or more contacts between an object and a portion of the housing;

determining, in response to the sensor signal, a first ESF haptic effect and a second ESF haptic effect based at least in part on the one or more contacts and the detected characteristics, the first ESF haptic effect comprising a static ESF haptic effect and the second ESF haptic effect comprising a dynamic ESF haptic effect;

determining, in response to the detected one or more contacts or the detected characteristics at the first location, the first ESF haptic effect based on the detected one or more contacts at the first location or at least in part on the detected characteristics;

determining, in response to the detected one or more contacts or the detected characteristics at the second location, the second ESF haptic effect based on the detected one or more contacts at the second location or at least in part on the detected characteristics;

transmitting a first ESF haptic signal associated with the first ESF haptic effect to a first ESF haptic output device disposed within the portion of the housing and a second ESF haptic signal associated with the second ESF haptic effect to a second ESF haptic output device disposed within the portion of the housing, the first ESF haptic output device configured to output static ESF haptic effects and the second ESF haptic output device configured to output dynamic ESF haptic effects, and wherein the first ESF haptic output device comprises:

a first conductive layer electrically coupled to a voltage source; and a first insulation layer disposed on the first conductive layer to prevent contact between a user and the first conductive layer, and the second ESF haptic output device comprises:

a second conductive layer electrically coupled to the voltage source; and a second insulation layer disposed on the second conductive layer to prevent contact between the user and the second conductive layer; and outputting, by the first ESF haptic output device, the static ESF haptic effect at the first location on the portion of the housing and, by the second ESF haptic output device, the dynamic ESF haptic effect at the second location on the portion of the housing.

14. The method of claim 13, wherein the first ESF haptic output device and the second ESF haptic output device comprise a single ESF haptic output device disposed within the housing.

15. The method of claim 13, wherein the computing device is a wearable device.

16. The method of claim 13, wherein the computing device is a handheld device.

* * * * *